United States Patent [19]

Carminati et al.

[11] Patent Number: 5,646,092
[45] Date of Patent: Jul. 8, 1997

[54] PRETREATED CLAYS, THEIR PREPARATION AND USE IN FORMULATION DRILLING MUDS NOT AGGRESSIVE TO LAYER CLAYS

[75] Inventors: Stefano Carminati, Seriate-Bergamo; Giovanni Burrafato, Tavazzano-Milan, both of Italy

[73] Assignees: Agip S.p.A.; Eniricerche S.p.A., both of Milan, Italy

[21] Appl. No.: 397,056

[22] PCT Filed: Sep. 23, 1993

[86] PCT No.: PCT/EP93/02586

§ 371 Date: Mar. 13, 1995

§ 102(e) Date: Mar. 13, 1995

[87] PCT Pub. No.: WO94/06881

PCT Pub. Date: Mar. 31, 1994

[30] Foreign Application Priority Data

Sep. 24, 1992 [IT] Italy ................... MI92A2188

[51] Int. Cl.$^6$ ................... C09K 7/02
[52] U.S. Cl. ............ 507/107; 507/108; 507/119; 507/120; 507/901
[58] Field of Search ........... 507/140, 901, 507/119, 107, 108, 120

[56] References Cited

U.S. PATENT DOCUMENTS

| 2,531,812 | 11/1950 | Hauser | 507/140 |
| 2,795,545 | 6/1957 | Gluesankamp | 507/140 |
| 3,313,730 | 4/1967 | Caruso | 507/140 |
| 3,687,846 | 8/1972 | Lang | 507/140 |
| 3,909,454 | 9/1975 | Azrad (Weisz) | 507/140 |
| 4,664,820 | 5/1987 | Magauran et al. | 507/140 |
| 4,843,048 | 6/1989 | House et al. | 507/140 |

*Primary Examiner*—Philip Tucker
*Attorney, Agent, or Firm*—Oblon, Spivak, McClelland, Maier & Neustadt, P.C.

[57] ABSTRACT

Disclosed is a process for preparing aqueous, clay-based muds, not aggressive to layer clays, which process comprises a first step in which clay is treated with an aqueous solution containing the necessary amount of dispersant to fluidify the mud; a second step, of separation of so treated clay from the aqueous solution containing any not adsorbed dispersant, and finally, a step of re-dispersion of so treated clay in water, in order to formulate the mud.

14 Claims, No Drawings

PRETREATED CLAYS, THEIR PREPARATION AND USE IN FORMULATION DRILLING MUDS NOT AGGRESSIVE TO LAYER CLAYS

This application is a 35 USC 371 of PCT/EP93/02586 filed Sep. 23, 1993.

The present invention relates to pre-treated clays, their preparation, and their use in formulating drilling muds which are not aggressive to layer clays.

In oil well drilling, very often water-based fluids are used which contain clays, in particular bentonite and various kinds of additives, among which are the necessary dispersants in order to obtain the desired rheological properties. As compared to oil-based muds, these water-based muds display the advantage of a lower cost and lower polluting capability; unfortunately, they display the drawback of being aggressive to the clay layers met during the borehole drilling and to the clay scraps generated during the course of the same drilling.

The dispersion of this clay into the fluid leads to the drilling fluid rheological properties becoming worse, and borehole sidewalls undergoing a partial or, in the worst case, a total failure, with the borehole becoming consequently occluded.

The aggressivity is partially due to the dispersants, generally of polymeric type, added to the mud in order to favour the dispersion of bentonitic clay and endow the mud with suitable fluidity. Because the polymeric dispersant is only partially adsorbed on bentonite, that portion of dispersant which remains free in solution can thus act also on layer clay and on the clay contained in the drilling scrap material, increasing the above problems.

In order to solve, or, at least, reduce these drawbacks, the prior art describes the use of further additives (which anyway cause an increase in total mud cost. For example, U.S. Pat. No. 4,664,818 claims an additive for borehole drilling fluids which is constituted by a partially hydrolyzed copoly(acrylate-acrylamide), a carboxy methyl cellulose and KCl at a level higher than 50%.

GB-A-2,216,574 teaches the addition of a polyglycerol to the drilling mud, as a solution to the problem.

EP-A-333,458 discloses mixtures of water-soluble, high-molecular-weight additives capable of forming strong enough nucleophilic sites when treated with bases and one or more potassium salts having a high enough alkalinity to increase the pH value of the drilling mud up to a higher value than 9.

U.S. Pat. No. 3,953,336 claims the use of water based muds containing a cellulose derivative.

The present Applicants have found now a process for preparing drilling muds which are less aggressive to layer clays, which overcomes the drawbacks which affect the prior art, by not containing more than minimal amounts of free dispersant dissolved in the solution.

In accordance therewith, the present invention relates to a process for preparing aqueous clay-based drilling muds which are not aggressive to layer clays, which process comprises:

(i) dispersing clay in an aqueous solution containing the necessary dispersant amount for fluidifying the mud;

(ii) separating clay from the aqueous solution containing the non-adsorbed dispersant;

(iii) re-dispersing in water the so treated clay, in order to formulate the mud.

According to the preferred embodiment, the clay used in order to prepare the mud is bentonite.

The most commonly used dispersants in order to fluidify bentonite-based muds are lignosulfonates, lignites, polyacrylates and partially hydrolyzed polyacrylamides.

According to the preferred embodiment of the present invention, the dispersants are polyacrylates or their copolymers, still more preferably polyacrylates.

The necessary dispersant amount in order to fluidify said muds depends on the chemical nature of the same dispersant, and on the type of bentonite.

When ligninic dispersant are used, such an amount is generally comprised within the range of from 0.5 to 3% by weight based on the mud, whilst when polymeric dispersants are used, such an amount is comprised within the range of from 0.03 to 0.5% by weight.

The clay may be suspended in water and the dispersant added, or, indifferently, the aqueous solution of dispersant may be added to pristine clay.

The aqueous dispersion of bentonite and the dispersant are mixed for a time period which is at least long enough in order to obtain the adsorption of the dispersant; said time period generally is of the order of approximately 30 minutes.

During this step, a portion of the dispersant is adsorbed on clay surface, with the balance remaining in the solution. The amount adsorbed on clay surface is the amount which corresponds to the solid-dispersant equilibrium. For dispersants of polyacrylic type, this amount is of approximately one third of the total amount added in order to fluidify the mud.

The temperature at which the clay is equilibrated with the dispersant is not determinative; preferably, the process is carried out at a temperature comprised within the range of from 10° to 40° C.

The pre-treated clay, i.e., the clay with its surface coated with dispersant additive, is then recovered.

Said clay can be separated from the aqueous solution according to well-known techniques of liquid-solid separation, preferably by centrifugation.

This clay recovery step can be followed by one or more washing steps with water, so as to completely remove any dispersant which is not strongly bonded to clay.

The so treated clay is then re-dispersed in water, and the resulting mud is used as a borehole drilling fluid, particularly suitable for drilling oil wells having temperatures of approximately 120°–170° C.

The resulting drilling mud can be admixed with other additives as usually employed in the end formulation. So, for example, thickening agents, fluid-loss agents, filtrate control agents, and so forth, can be added.

Furthermore, to the so formulated drilling mud water-soluble salts can be added in order to regulate the ionic strength, as well as suitable substances for adjusting the pH value of the same mud at the desired value. In general, the pH value of the so formulated mud is comprised within the range of from 9 to 12.

The re-dispersion in water of the so treated bentonite does not cause the removal of the adsorbed dispersant (at least under customary drilling mud use time and temperature conditions). This means that said adsorbed dispersant will continue to perform its task as bentonite dispersant also in the absence of other dispersants in solution.

The so prepared mud, by being practically free from water dissolved dispersant, demonstrates less aggressive behavior to layer clays and the overall process requires a lower consumption of dispersant additive, because the unadsorbed amount contained in the initial aqueous solution can be easily recovered and recycled.

The pre-treated clay according to the present invention can also be stored for long time and used when necessary in order to prepare the drilling mud.

The following examples are reported in order to better disclosed the present invention.

EXAMPLES

PREPARATION OF BENTONITES FOR INHIBITING MUDS

Scheme 1: This procedure to prepare a drilling mud which is not aggressive to layer clays is based on the removal, by means of washing steps, of the free dispersant dissolved in the continuous phase, from a dispersion of bentonitic clay admixed with dispersant.

A dispersion of bentonite in water is prepared with a suitable amount of dispersant; the clay dispersion is centrifuged and (1) a compact sediment of clay with adsorbed dispersant and (2) a water solution containing non-adsorbed dispersant (supernatant) are obtained.

The so prepared bentonite (step 1) is the base component for preparing the non-aggressive mud.

Example 1

The extent to which the dispersant added to the dispersion is adsorbed on clay and the reversibility of adsorption were verified by using an aqueous dispersion of homoionic sodium montmorillonite SWy-1 from Wyoming, with the dispersant being a commercial polyacrylate having an Mw of approximately 4000, prepared under the following conditions: Na-montmorillonite : 0.27% w/w, dispersant: 0.13% w/w, salinity: 0.05, M NaCl, pH: 11.

The so prepared dispersion is allowed to equilibrate during 16 hours and then is submitted to a 2-hour centrifugation at 14,000 rpm. The obtained supernatant was submitted to a TOC (Total Organic Carbon) analysis in order to determine the amount of free dispersant contained in solution, in the initial dispersion. The sediment (bentonite with adsorbed dispersant) was re-dispersed in a fresh solvent, having, in this circumstance, the same salinity and pH conditions as of the initial dispersion (pH 11, 0.05 M NaCl), and the dispersion was then allowed to equilibrate for 16 hours. The resulting equilibrated dispersion was then centrifuged again and the amount of dispersant in the supernatant was determined in order to check whether any adsorbed dispersant possibly been released. This cycle was repeated three times and the results are reported in Table 1.

TABLE 1

Test of dispersant desorption with successive washes

| Bentonite Dispersion | ppm of non-adsorbed dispersant |
| --- | --- |
| Initial | 840 |
| After 1 redispersion | 12 |
| After 2 redispersions | 4 |
| After 3 redispersions | 0 |

It may be observed that a lower and lower amount of dispersant present in the sediment is found in solution after successive clay redispersions. This result would suggest that the portion of dispersant which remain adsorbed is strongly bonded to the adsorbing clay surface.

Example 2

In this Example, the performance is verified of the dispersion as prepared according to the procedure disclosed in Scheme 1 of Example 1, by comparing 3 dispersions to each other:

(1) 3.7% w/w of Wyoming bentonite in water ("Sample A");

(2) the same dispersion as of above item (1), with such an amount of dispersant added, as to have a ratio of dispersant : clay, by weight, of 0.012 ("Sample B");

(3) dispersion with pre-treated clay at the same concentration as of the sample of above item 1 ("Sample C").

Inasmuch as the procedure of Scheme 1, owing to the washes with deionized water, causes in the end dispersion a decrease in the amount of salt in solution, as compared to Samples A and B, for Sample C a preparation procedure was used (Scheme 2), which is slightly different from the preceding one.

Scheme 2: a dispersion of Wyoming bentonite in water at 3.7% w/w is prepared and is allowed to stand 24 hours in order to undergo hydration; then, the dispersant is so added, as to get a ratio of dispersant : clay, by weight, of 0.012, and the resulting dispersion is allowed to equilibrate for 48 hours. By submitting the resulting dispersion to a 2-hour centrifugation at 14,000 rpm, the separation is obtained of the solid, dispersant bearing sediment "SD" from the dissolved dispersant containing supernatant "LD". At the same time, the initial aqueous dispersion containing 3.7% w/w of Wyoming bentonite is centrifuged for 2 hours at 14,000 rpm, in order to obtain the liquid supernatant "L"; finally, the sediment with dispersant "SD" is redispersed in the supernatant "L".

In that way, a dispersion of pre-treated clay is obtained in which the aqueous phase has salinity and pH values which are approximately the same as of Samples A and B. The rheological properties of the three Samples prepared in that way are reported in Table 2. The measurements are carried out by means of a Bohlin VOR rotary viscometer. The viscosity values at 1.16 $s^{-1}$ and 92.3 $m^{-1}$, and the values of elastic modulus G' at 1 Hz are reported in Table 2.

TABLE 2

Rheological characteristics of the base dispersion (A), of the dispersion admixed with the dispersant (B) and of the dispersion treated according to Scheme 2 (C).

| | G' (Pa) | Viscosity (1.16 $s^{-1}$) (Pa"s) | Viscosity (92.3 $s^{-1}$) (Pa"s) |
| --- | --- | --- | --- |
| Sample A | 14.9 | 2.32 | 0.086 |
| Sample B | 0.5 | 0.17 | 0.006 |
| Sample C | 0.5 | 0.31 | 0.007 |

The data from Table 2 demonstrate that the dispersant portion remained adsorbed on bentonite of Sample C is large enough in order to allow the dispersion treated according to the present invention to retain the same rheological characteristics as of Sample B, formulated according to the normal procedure.

Example 3

In order to verify that the adsorbtion of the dispersant on clay is very strong and that the good dispersion of bentonitic clay is retained also at high temperatures, rheological measurements were carried out after high temperature ageing (150° C. for 16 hours).

The samples used for these tests were prepared according to the same procedure as disclosed in Scheme 2 of Example 2, and the comparison measurements were carried out on 2 dispersions:

(1) dispersion containing 7% Magcogel bentonite admixed with dispersant, so as to have a ratio of dispersant : clay by weight, of 0.012 (Sample B);

(2) the same starting dispersion as of above item (1) after pre-treatment (Sample C).

The results reported in Table 3 relate to the measurements carried out on Samples B and C before and after thermal ageing.

TABLE 3

Rheological parameters before and after thermal ageing at 150° C. for 16 hours

|  | Sample B | | Sample C | |
| --- | --- | --- | --- | --- |
|  | before ageing | after ageing | before ageing | after ageing |
| A.V. | 30 | 46 | 28.5 | 38 |
| P.V. | 23 | 32 | 23 | 28 |
| Y.P. | 7 | 14 | 5.5 | 10 |
| GELS | 3.5/4 | 4/10 | 2/2.5 | 1/2 |
| pH | 8.9 | 8.9 | 9.3 | 8.8 |

From the above measurements, one may observe that, even after heat ageing, the rheological properties of both dispersions have remained approximately the same.

Example 4

The not-rolling test (HRT) is used in order to demonstrate that the treated dispersion, from which the free dispersant in solution was removed, is less aggressive to layer clay, than a dispersion to which the dispersant was added by means of the normal procedure according to the prior art.

The test is carried out by adding to the dispersion known amounts of layer clay in granular form, with defined particle size (2–4 mm). The so prepared dispersion is submitted to heat ageing for a 4-hour time at 93° C., inside a container kept rolling at a revolution speed of 17 rpm. Finally, the dispersion is cooled and from it the residue of granular clay is removed.

These recovered granules are washed with an inhibiting fluid, are oven dried and are weighed to determine the percent amount of recovered layer clay. The higher the aggressivity of the dispersion, the smaller the recovered amount of granular layer clay.

In Table 4, the results are reported which were obtained from the measurements carried out with a rotary viscometer Fann 35 SA with R1F1B1 equipment, together with the results from the not-rolling test carried out on mud B and on mud C, treated according to the present invention.

The values of apparent viscosity A.V., Plastic viscosity P.V., yield point Y.P. and gel strength are very similar for Sample B, admixed with dispersant, and Sample C, admixed with dispersant and treated according to the present invention before being submitted to HRT.

TABLE 4

Rheological parameters before and after HRT with related recovery values after HRT

|  | Sample B | | Sample C | |
| --- | --- | --- | --- | --- |
|  | before ageing | after ageing | before ageing | after ageing |
| A.V. | 30 | 40 | 28.5 | 33 |
| P.V. | 23 | 29 | 23 | 23 |
| Y.P. | 7 | 11 | 5.5 | 10 |
| GELS | 3.5/4 | 3/3.5 | 2/2.5 | 1/1.5 |
| Clay recovery rate |  | 45% |  | 63% |

The HRT test carried out on these dispersions confirms that, by removing the excess dispersant from the solution, the aggressivity of the dispersion to layer clay decreases. With Sample B a clay recovery rate of 45% is obtained versus a recovery rate of 63% obtained with Sample C.

The rheological measurements carried out on the dispersions after the HRT test show that the layer clay, which has been partially dispersed, generally increased the rheological parameters, however without a strong effect on the behaviour. It should be observed that Sample C, by causing a lower dispersion of layer clay into the mud, caused lower increases.

From this experimental picture, one may conclude that the treatment of clay according to the present invention gives the dispersion rheological characteristics which are comparable to those conferred to the dispersion by a dispersant addition; moreover, the treated dispersion proves to be less aggressive to layer clay.

We claim:

1. A process for preparing aqueous clay-based drilling muds, which consists essentially of:
    (i) forming a dispersion of a clay in an aqueous medium consisting of water and an amount of a dispersing agent selected from the group consisting of lignosulfonates, lignites, polyacrylates and partially hydrolyzed polyacrylamides necessary to fluidify the clay, thereby adsorbing at least some of the dispersing agent on the surface of the clay;
    (ii) separating the clay of step (i) having dispersing agent adsorbed therein from the aqueous solution containing any remaining non-adsorbed dispersant; and
    (iii) redispersing the treated clay of step (ii) in water, in order to formulate said drilling mud, which is not aggressive to layer clays.

2. The process according to claim 1, in which said clay is bentonite.

3. The process according to claim 1, in which the dispersant is a polyacrylate or a copolymer thereof.

4. The process according to claim 3, in which the dispersant is a polyacrylate.

5. The process according to claim 1, in which said clay is separated from the dispersant containing aqueous solution by centrifugation.

6. The process according to claim 1, wherein said aqueous medium contains from 0.5–3% by weight of a liginic dispersant.

7. The process according to claim 1, wherein said aqueous medium contains from 0.03–0.5% by weight of a polymeric dispersant.

8. The process according to claim 1, wherein the aqueous dispersion is formed at a temperature of from 10°–40° C.

9. The process according to claim 1, wherein the amount of dispersing agent adsorbed on the clay corresponds to the solid-dispersant equilibrium of the clay/aqueous dispersion.

10. A pre-treated clay prepared by:
    (i) forming a dispersion of a clay in an aqueous medium consisting of water and an amount of a dispersing agent selected from the group consisting of lignosulfonates, lignites, polyacrylates and partially hydrolyzed polyacrylamides necessary to fluidify the clay, thereby adsorbing at least some of the dispersing agent on the surface of the clay, and
    (ii) separating said clay having dispersing agent adsorbed therein from the aqueous solution which contains any remaining non-adsorbed dispersant.

11. The pre-treated clay according to claim 10, in which said clay is bentonite.

12. An aqueous drilling mud composition comprising the pre-treated clay of claim 10.

13. A method for drilling oil wells comprising:

drilling the ground containing layer clays with a drilling apparatus which employs the aqueous drilling mud composition of claim 12.

14. The method for drilling oil wells of claim 13, wherein the temperature during drilling within the earth ranges from 120°–170° C.

* * * * *

UNITED STATES PATENT AND TRADEMARK OFFICE
CERTIFICATE OF CORRECTION

PATENT NO. : 5,646,092
DATED : July 8, 1997
INVENTOR(S) : Stefano CARMINATI, et al.

It is certified that error appears in the above-indentified patent and that said Letters Patent is hereby corrected as shown below:

On the title page, Item [54], and Column 1, line 2,

"FORMULATION" shoud read -- FORMULATING --.

Signed and Sealed this

Sixteenth Day of September, 1997

Attest:

BRUCE LEHMAN

Attesting Officer

Commissioner of Patents and Trademarks